United States Patent [19]
Schutten et al.

[11] Patent Number: 5,999,424
[45] Date of Patent: Dec. 7, 1999

[54] BI-DIRECTIONAL ENERGY DIODE CONVERTER USING MULTIPULSE CONTROL

[75] Inventors: Michael Joseph Schutten; Mustansir Hussainy Kheraluwala, both of Schenectady, N.Y.

[73] Assignee: General Electric Company, Schenectady, N.Y.

[21] Appl. No.: 09/027,820

[22] Filed: Feb. 23, 1998

[51] Int. Cl.$^6$ ................................................ H02H 7/125
[52] U.S. Cl. .......................... 363/52; 363/16; 363/17; 363/98
[58] Field of Search .............................. 363/16, 17, 50, 363/52, 53, 97, 98, 131, 132, 126; 361/45

[56] References Cited

U.S. PATENT DOCUMENTS

| | | | |
|---|---|---|---|
| 4,527,228 | 7/1985 | Chi Yu ........................................ | 363/98 |
| 4,578,732 | 3/1986 | Draper et al. ............................. | 361/45 |

*Primary Examiner*—Y. J. Han
*Attorney, Agent, or Firm*—Jill M. Breedlove; Douglas E. Stoner

[57] ABSTRACT

A control method and apparatus for reducing transformer core volume in a power converter of the type having a switching circuit coupled to a primary winding of the transformer for selectively coupling the primary winding to a dc voltage source, a secondary winding of the transformer being coupled to an output rectifier circuit for developing a relatively high dc voltage across an output capacitor. The apparatus includes a high voltage zener diode clamp for limiting the maximum voltage on the capacitor, and the rectifier circuit includes at least a pair of zener diodes connected for blocking reverse current flow through the rectifier circuit. The method includes the steps of coupling the transformer primary winding to the dc voltage source to establish a relatively short resonant charging pulse for developing an initial charging current to the output capacitor, disconnecting the dc voltage source from the transformer primary winding for a time interval which is relatively long with respect to the charging interval to allow the transformer reactances and resonant capacitor to reset to zero energy conditions, and repeating the steps of coupling and disconnecting until the output capacitor is charged to the zener clamp voltage. A reverse process is used to step-wise discharge the output capacitor.

11 Claims, 5 Drawing Sheets

BI-DIRECTIONAL ENERGY DIODE CONVERTER USING MULTIPULSE CONTROL

BACKGROUND OF THE INVENTION

The present invention relates to dc-to-dc power converters and, more particularly, to a control method and apparatus for a high voltage, reduced size converter.

Voltage converters are commonly used to convert direct current (dc) voltage at one level to voltage at another level. In many instances, the voltage converter is used to step up a relatively low voltage, e.g., 115–230 volts, to a relatively high voltage, e.g., several thousand volts. By way of example, a voltage converter for x-ray diagnostic machines may use rectified utility line voltage at about 115 volts to produce an x-ray tube grid voltage of about 3600 volts. An exemplary converter circuit for such purpose includes a rectifier to convert 115 volt ac voltage to dc voltage, a voltage doubler to raise the dc voltage to about 320 volts and a half-bridge dc-to-dc converter to raise the 320 volts to 3600 volts. The half-bridge converter typically uses a series pair of switching devices to connect a resonant capacitor and a primary winding of a transformer to the 320 volt source. This comprises a series resonant circuit, where the resonant inductor is the transformer leakage inductance. The transformer secondary winding is coupled to an output rectifier. One of the disadvantages of this type of converter using single resonant pulse control to transfer sufficient energy to the output capacitor to produce the regulated 3600 volt dc output is the large transformer magnetic core flux which increases the weight, volume, and cost of the converter circuit.

SUMMARY OF THE INVENTION

The present invention includes a dc-to-dc voltage converter circuit which overcomes the above and other disadvantages of the prior art. In an illustrative embodiment, the invention is implemented in a grid circuit for an x-ray tube in which 115 volt alternating current (vac) is converted to 3600 volt direct current (vdc) for application to an x-ray tube grid. The circuit includes a rectifier coupled to a voltage doubler for developing a dc voltage. The voltage doubler output is applied across a serially connected pair of electronic switching devices forming the switching portion of a half-bridge dc-to-dc converter. A primary winding of a power transformer, in series with a resonant capacitor, is coupled between a junction intermediate the switching devices and a midpoint of the voltage doubler. A secondary winding of the transformer is connected to a full bridge rectifier which provides the high voltage (3600 vdc) across an output capacitor. A zener diode limits the magnitude of the output voltage while two additional zener diodes coupled in the rectifier circuit are used to prevent reverse current flow through the rectifier during transformer core reset.

In operation, the switching devices are gated on to apply a sequence of current pulses to the transformer primary. During each current pulse, the transformer supplies power to the output capacitor to charge the capacitor towards the desired voltage. Between current pulses, the transformer reactive components and the resonant capacitor are allowed to reset, i.e., the switching devices are non-conducting and the transformer primary and resonant capacitor are bypassed by shunt resistors. The reset interval is substantially longer than the current pulse interval, e.g., 3 microseconds versus 26 microseconds. It is desirable to have as many resonant charge (or discharge) pulses, while still meeting the output voltage rise time specification. In the illustrative design, a total of six pulses charges the output capacitor to 3600 volts. This has the effect of reducing the transformer core size in proportion to the number of resonant charge/discharge pulses. The output capacitor voltage is discharged in a reverse procedure by periodically applying reverse polarity voltage across the series combination of the resonant capacitor and the transformer primary, using the switching devices. Using the proposed method of multi-pulse control, a much smaller packet of energy is transferred to the output during each resonant pulse, thus allowing a smaller transformer core without resulting in saturation, and also improved charge/discharge and refresh characteristics. The transformer secondary winding is connected to an output rectifier to produce the dc output voltage.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
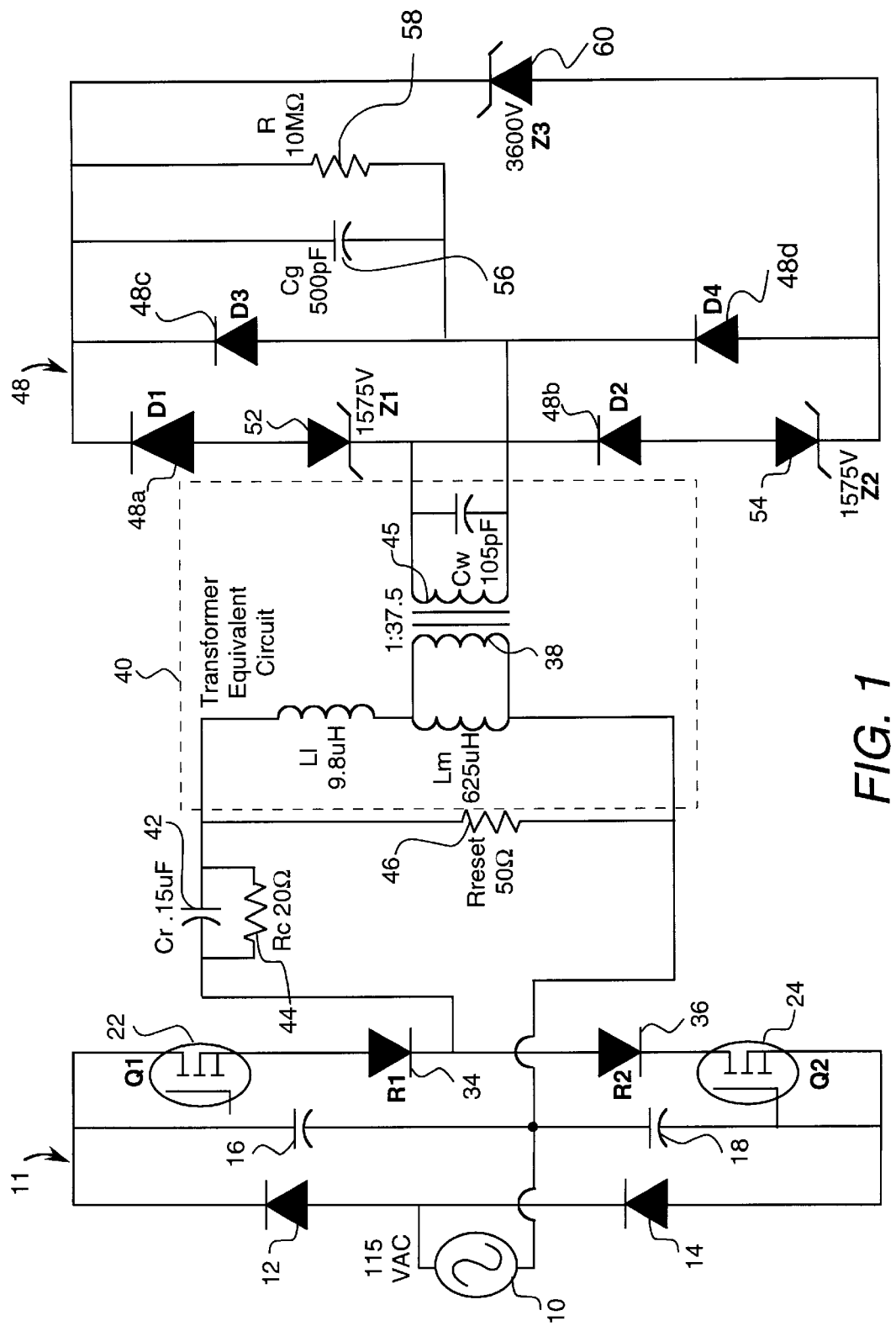
FIG. 1 a simplified schematic representation of a power converter circuit (including the transformer parasitic reactances) in accordance with the present invention.

FIG. 1 is a simplified schematic representation of a power converter in accordance with the present invention for supplying high dc voltage to a grid circuit of an x-ray tube (not shown). The converter circuit is adaptively connected to a source of conventional ac utility power indicated at 10. The ac power is applied to a voltage doubler 11 circuit comprising a pair of series connected diodes 12, 14 and a pair of series connected capacitors 16 and 18. The output of the voltage doubler 11 may be applied to a switching circuit comprising a pair of serially connected switching devices 22, 24. A pair of reverse current blocking diodes 34, 36 are serially connected between the switching devices 22, 24. The switching devices 22, 24 form part of a conventional half-bridge circuit and are adapted to selectively connect a primary winding 38 of a power transformer 40 in series with a resonant capacitor 42 to the source of dc voltage. In particular, the primary winding 38 has one terminal connected through a resonant capacitor 42 to a junction intermediate the pair of diodes 34, 36. Another terminal of the primary winding 38 is connected to the junction intermediate the voltage doubler capacitors 16, 18. The resonant capacitor 42 is bypassed by a bleeder resistor 44. In addition, another resistor 46 is connected in parallel with the primary winding 38 and provides a path for dissipation of energy in the transformer magnetizing inductance when neither of the switching devices 22, 24 are conducting.

The transformer secondary winding 45 is connected to a full bridge output rectifier circuit 48 comprising four diodes 48a, 48b, 48c, and 48d connected in a conventional arrangement. The full-bridge output rectifier circuit also includes a pair of zener diodes 52, 54 connected to corresponding ones of the two diodes 48a, 48b. Zener diodes 52 and 54 are connected in an anti-series fashion with respect to rectifier diodes 48a and 48b. (Anti-series diodes are defined herein as diodes connected to have voltage drops of opposite polarity, i.e., cathode-to-cathode or anode-to-anode.) The zener diodes 52, 54 provide current blocking so long as the transformer secondary voltage is less than the breakdown voltage of the zener diodes. For purposes of this invention, the output voltage is described as being in the order of 3600 volts and the breakover voltage of the zener diodes 52, 54 may be in the order of 1575 volts. The dc output voltage produced by the rectifier circuit 48 is applied to an output capacitor 56 which may be shunted with a high resistance bleeder resistor 58. A zener diode 60 is connected across the output of the full-bridge rectifier circuit 48 and provides voltage clamping to limit the output voltage on the capacitor 56 to the breakover voltage of the zener diode 60, e.g., 3600 volts. In the illustrative embodiment, the values of the relevant resistors and capacitors are selected to be as follows:

resistor 44 20Ω capacitor 42 0.15 μF resistor 46 50Ω capacitor 56 500 pF resistor 58 10MΩ

In order to understand the operation of the circuit of FIG. 1, the transformer 40 is illustrated in conjunction with its parasitic components including winding capacitance $C_W$ (105 pF), magnetizing inductance $L_M$ (625 μH) and leakage inductance $L_L$ (9.8 μH). Although not shown, it will be recognized that a control circuit is provided to gate the devices 22, 24 into conduction at appropriate times. In the operation of the circuit of FIG. 1, the switching device 22 is initially gated into conduction allowing current to flow through the diode 34, the resonant capacitor 42, the series resonant leakage inductance $L_L$ of the transformer, the primary winding 38, returning to the intermediate voltage junction between the capacitors 16 and 18. The resonant charging pulse for the resonant component values of FIG. 1 is on the order of 3 microseconds. While the switching device 22 is conducting, current flows through the transformer primary winding 38 and current is induced in the transformer secondary winding 45. The transformer secondary voltage is the sum of the breakover voltage of zener diode 52 and the output capacitor 56 voltage. Current flows through zener diode 52, and the conventional diode 48a of the rectifier circuit 48 to transfer charge to the output capacitor 56. At the end of the capacitor 56 charge pulse of about 3 microseconds, it becomes necessary to reset the resonant capacitor 42 to zero volts and to reset the transformer magnetizing inductance current and winding capacitor voltage to zero. During this reset interval, both the switches 22, 24 are maintained in a non-conducting state. The reset interval for the illustrative embodiment requires about 26 microseconds.

Figure 3:
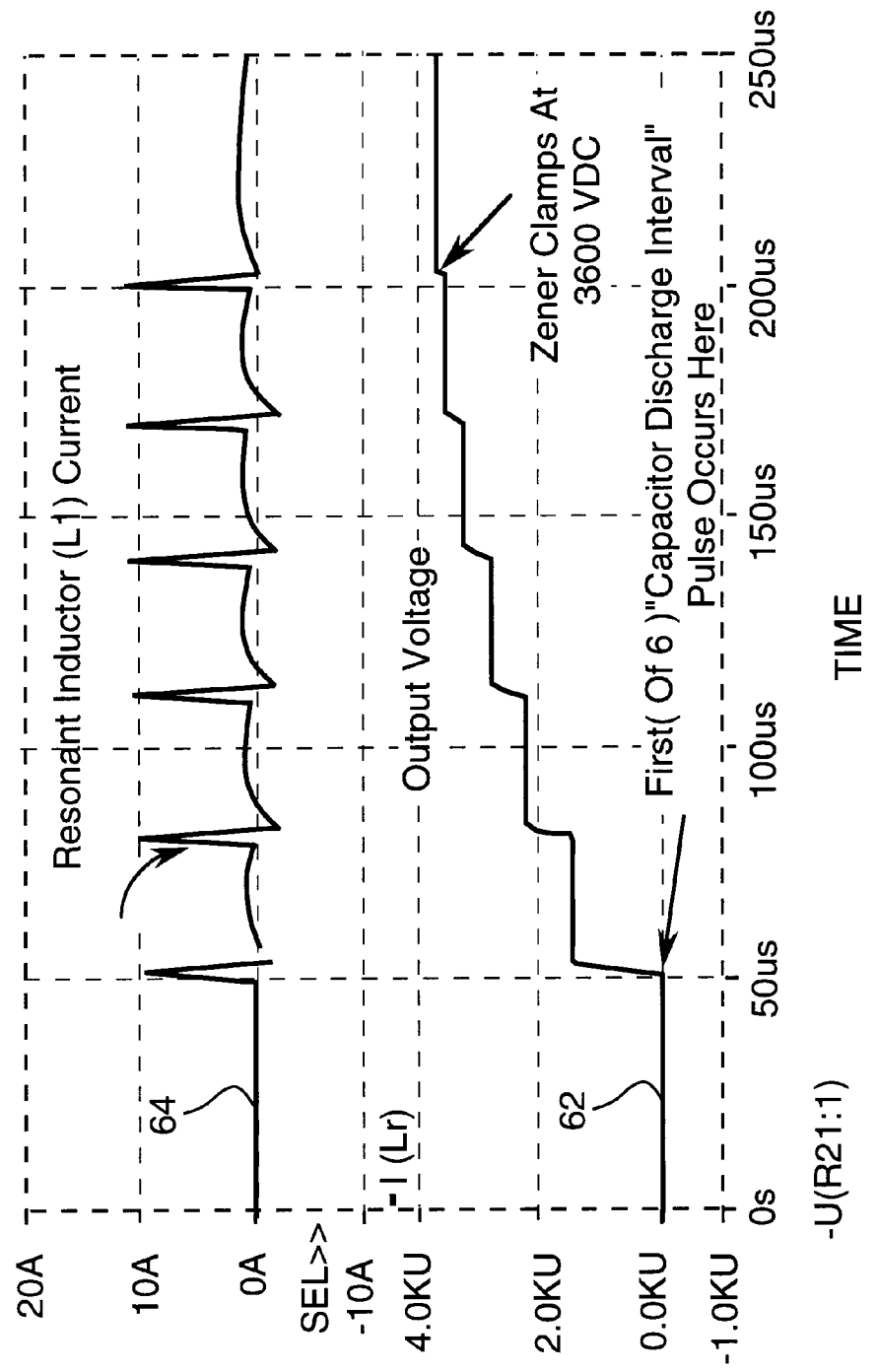
FIG. 3 is a time expanded view of the capacitor charging interval of FIG. 2.
Figure 4:
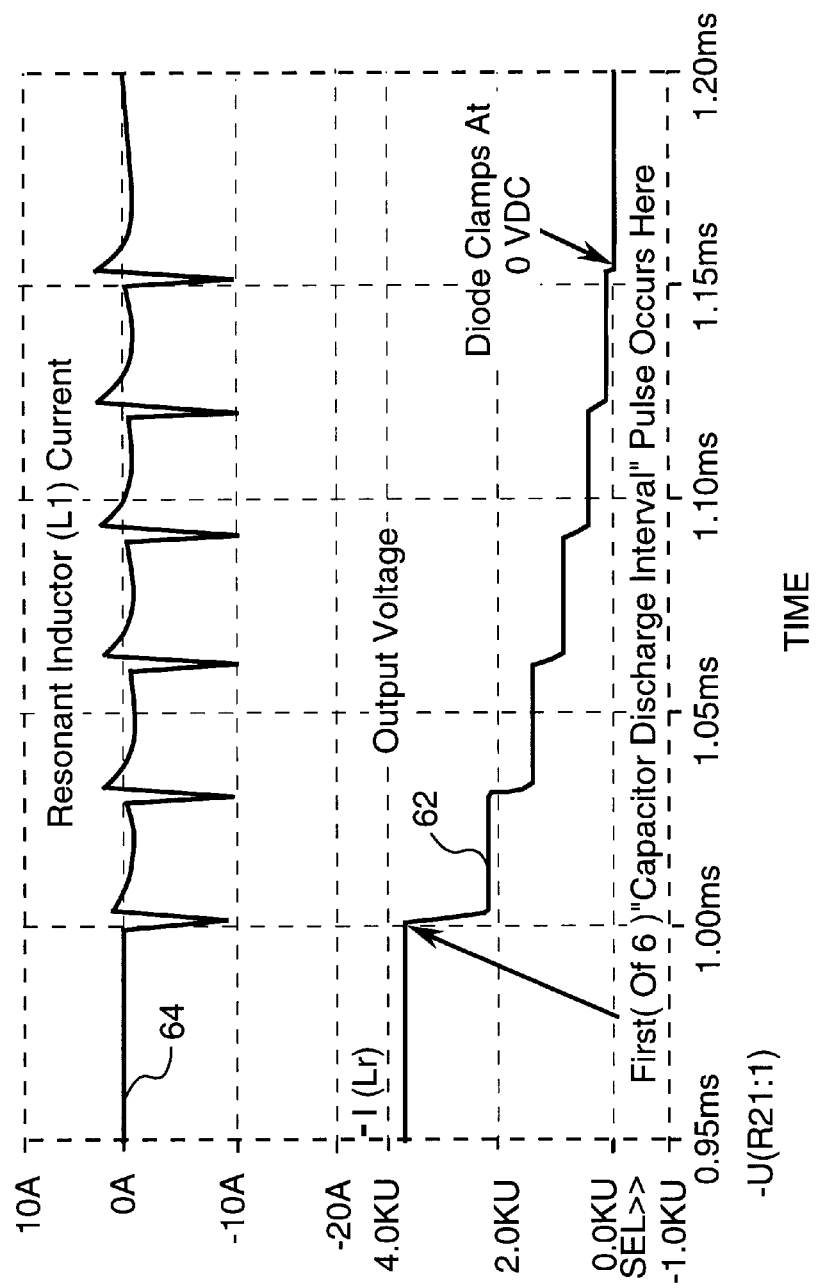
FIG. 4 is a time expanded view of capacitor discharging interval of FIG. 2.

In order to fully charge the output capacitor 56 using the small transformer 40, it is necessary to repeat the charge and reset intervals several times as shown in FIGS. 3 and 4. For the circuit of FIG. 1, the amount of charge transferred to the capacitor 56 for each pulse was selected to be sufficient to reach full voltage on the capacitor 56 using six successive pulses as illustrated in this embodiment. Of course, between each pulse applied to the primary winding of the transformer 40, a reset interval is provided to allow the appropriate reactive components of the circuit to reset to their initial zero voltage and zero current conditions. When the voltage on the capacitor 56 reaches the zener 60 clamp voltage, e.g., 3600 volts, current is diverted from the capacitor 56 to the output zener diode 60, and rectifier diodes 48a, 48d and zener 52. This assures that the capacitor output voltage is clamped at 3600 volts even though current is still flowing in the secondary of the transformer.

When it is desired to discharge the output capacitor 56, a reverse procedure is used in which the lower switching device 24 is gated into conduction to initiate a resonant discharge pulse to apply a reverse polarity voltage across the transformer primary winding 38 which reduces the output capacitor 56 voltage causing current in the output capacitor discharge through the zener diode 60, zener diode 54 and diode 48b in the rectifier circuit 48. Again, due to the amount of energy in the capacitor which must be discharged, an undesirable amount of energy becomes stored in the transformer magnetizing inductance Lm, winding capacitance Cw, and resonant capacitor 42. Consequently, the discharge interval for the capacitor 56 is selected to be the same length of time as the charge interval, for example, three microseconds. Between each of the discharge intervals, both of the switching devices 22, 24 are maintained in a non-conducting state allowing the resonant capacitor 42 to discharge towards zero volts and the transformer magnetizing inductance and winding capacitance in the transformer to also discharge towards zero amps and zero volts, respectively. Again, a typical interval between the discharge pulses is selected to be about 26 microseconds for the illustrative embodiment. The illustrative number of resonant discharge pulses is selected to be six or the same as the number of charge pulses as shown in FIGS. 2–5 so that the energy on the capacitor is partially discharged during each discharge pulse. When the output voltage on the capacitor 56 reaches zero volts, current will no longer flow through the output capacitor 56 but will flow through the rectifier diode 48c which is in parallel with the capacitor 56 and thus clamps the output capacitor voltage to zero volts. Any additional current in the transformer secondary winding 45 will be shunted through the diode 48c, zener diodes 60, 54 and diode 48b and thereby hold the output capacitor voltage at zero volts.

It will be noted that when the capacitor 56 is in a charged state and holding the charge at approximately 3600 volts, some of the charge will dissipate through the parallel resistance 58. Accordingly, it is necessary to periodically refresh the charge on the capacitor 56. Depending upon the value of the resistor 58, the refresh charge interval may be in the order of every 200 to 300 microseconds at which time the primary winding 38 of the transformer 40 is again pulsed to transfer additional energy to the output capacitor 56 by initiating a resonant current pulse by gating on the upper switching device 22 as described above. Again, the output capacitor will be clamped to 3600 volts since zener diode 60 clamps the output at that level.

Figure 2:
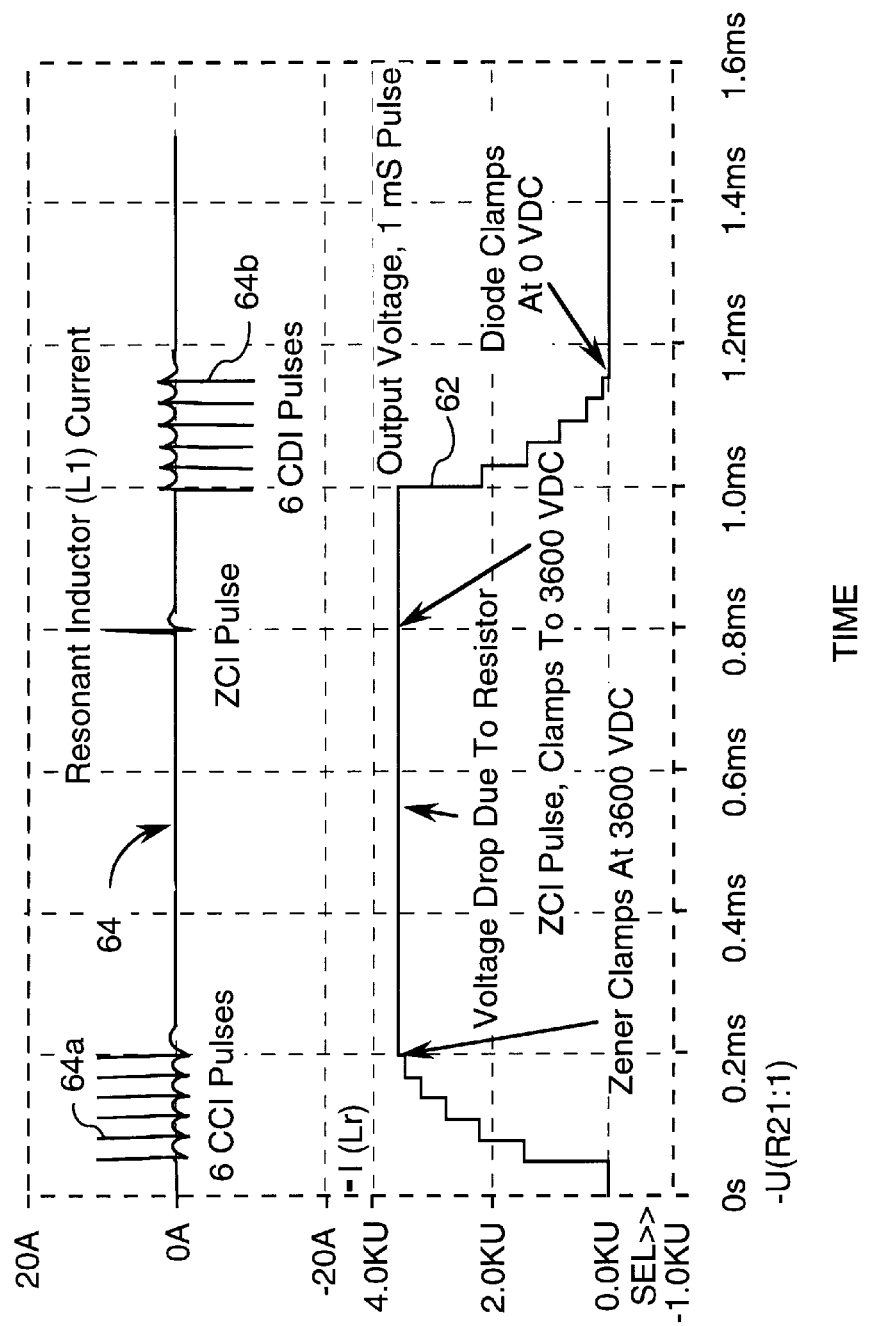
FIG. 2 is a graph showing the charge and discharge of the output capacitor in the circuit of FIG. 1.

FIG. 2 illustrates a plot 62 of the charge, refresh, and discharge modes of the voltage on the output capacitor 56 in conjunction with the resonant current pulses 64 illustrating the step-wise charging and discharging of the output capacitor 56. These resonant current pulses are implemented by gating of the switching devices 22, 24. The pulses 64a correspond to gating of the device 22 and the pulses 64b correspond to gating of device 24. The plot 62 shows that a determinable amount of charge is transferred to or from capacitor 56 with each pulse.

Figure 5:
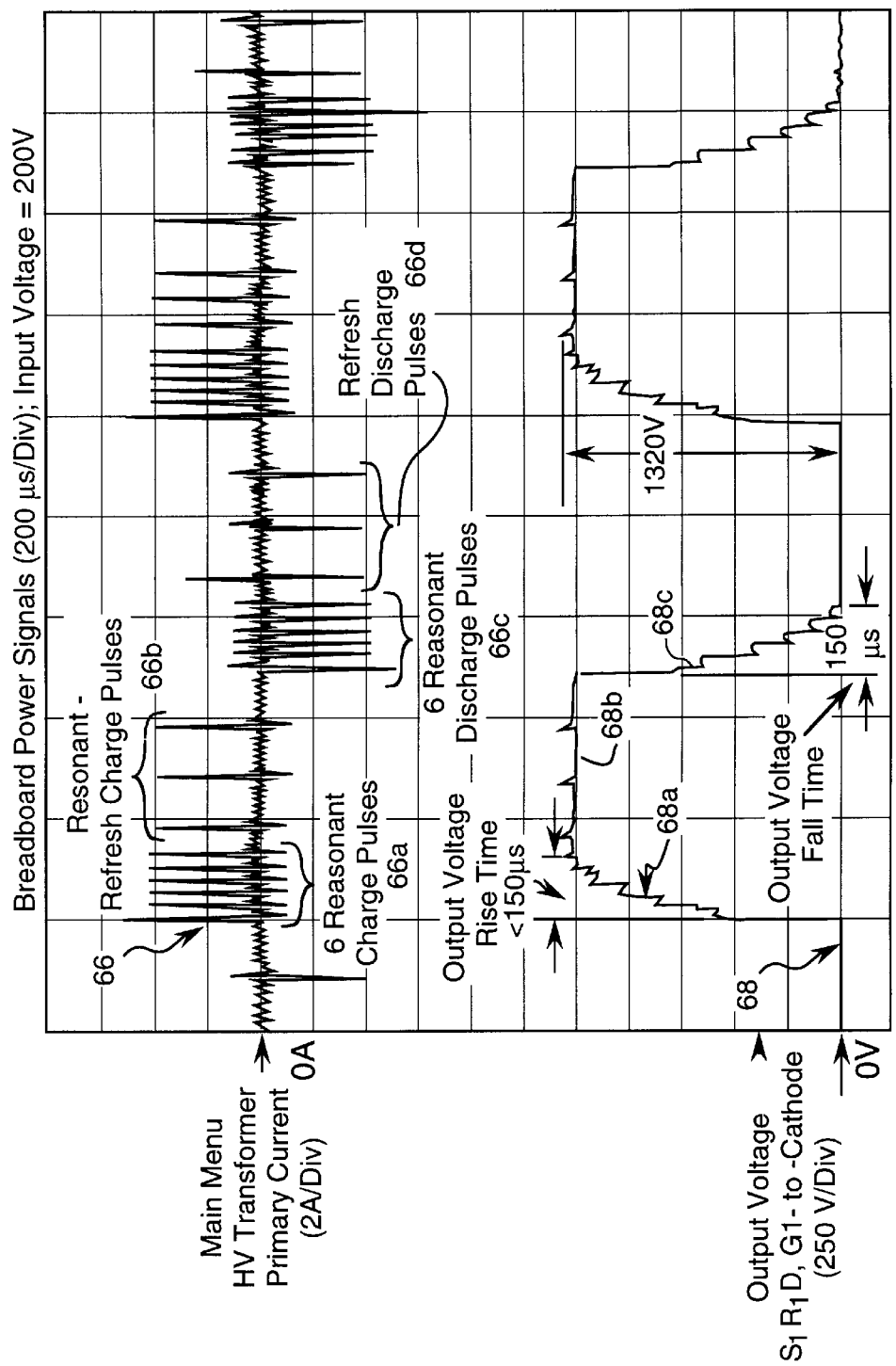
FIG. 5 is an oscillogram from a scaled breadboard implementation showing the charge, discharge and refresh of the output capacitor in the circuit of FIG. 1.

FIG. 3 illustrates an expanded view of the charge mode while FIG. 4 illustrates an expanded view of the discharge mode. FIG. 5 are actual oscillograms from a voltage scaled down functional hardware prototype of an embodiment of this invention illustrating charging pulses, refresh charge pulses, discharge pulses and refresh discharge pulses. The refresh pulses between charge and discharge intervals maintain the desired capacitor voltage. More particularly, oscillogram 66 shows six resonant charge pulses at 66a which stepwise charges output capacitor 56 as shown on oscillogram 68 at 68a. The refresh charge pulses 66b are in response to voltage dropping on capacitor 56 and function to refresh or recharge the capacitor back to the desired voltage as shown at 68b. The six resonant discharge pulses at 66c effect discharge of capacitor 56 as shown at 68c. Refresh discharge pulses 66d assure that capacitor 56 remains discharged.

What has been described is a power converter circuit in which a high dc voltage can be achieved using a low volume transformer core by step-wise charging of the output capacitor to the high voltage using resonant pulses with time intervals between the pulses to reset the transformer reactances and resonant capacitor to their initial zero state. Further, the circuit has been so designed using breakover devices such as zener diodes to prevent reverse current through the output capacitor during the reset intervals. While the invention has been described in what is presently considered to be a preferred embodiment, various modifications and variations will become apparent to those skilled in the art. It is intended therefore that the invention not be limited to the specific disclosed embodiment but be interpreted within the full spirit and scope of the appended claims.

What is claimed:

1. A control method for reducing transformer core volume in a power converter of the type having a half-bridge switching circuit coupled to a primary winding of the transformer for selectively coupling the primary winding to a dc voltage source, a secondary winding of the transformer being coupled to an output rectifier circuit for developing a relatively high dc voltage across an output capacitor, a high voltage zener diode clamp for limiting the maximum voltage on the capacitor, the rectifier circuit including at least a pair of zener diodes connected for blocking reverse current flow through the rectifier circuit, the method comprising the steps of:

coupling the transformer primary winding to the dc voltage source to establish a relatively short resonant charging pulse for developing an initial charging current to the output capacitor;

disconnecting the dc voltage source from the transformer primary winding for a time interval which is relatively long with respect to the charging interval to allow the transformer reactances and a resonant capacitor to reset to zero energy conditions; and repeating the steps of coupling and disconnecting until the output capacitor is charged to the zener clamp voltage.

2. The method of claim 1 and including discharging the output capacitor by the steps of:

applying a voltage of reverse polarity to the transformer primary winding for a relatively short interval to initiate discharging of the output capacitor;

decoupling the voltage from the primary winding for a time interval sufficient to reset the transformer reactances and resonant capacitor current to zero energy conditions; and repeating the steps of applying and decoupling until the voltage on the output capacitor is clamped to zero volts.

3. The method of claim 1 wherein the circuit components are selected such that the steps of coupling and disconnecting are maintained for time intervals of about 3 microseconds and 26 microseconds, respectively.

4. The method of claim 1 wherein the charging time interval is shorter than the time interval to reset the transformer reactances and the resonant capacitor to zero energy conditions.

5. The method of claim 1 and including the step of initiating a recharge pulse when the output voltage drops below a selected magnitude.

6. A high voltage converter comprising:

a transformer having a primary winding and at least one secondary winding;

a pair of serially connected switching devices arranged for selectively coupling the transformer primary winding to a source of relatively low dc voltage;

a rectifier circuit coupled to output terminals of said transformer secondary winding for providing a dc output voltage therefrom, said rectifier circuit including zener diodes connected in anti-series circuit therewith for preventing reverse current flow through said rectifier circuit for output voltages less than the zener breakdown voltage;

an output capacitor connected to receive charge from said rectifier circuit; and a voltage clamp connected in circuit with said rectifier circuit and said output capacitor for clamping voltage on said output capacitor to a desired value.

7. The converter circuit of claim 6 wherein said rectifier circuit comprises a bridge rectifier coupled in a bridge network, and said zener diodes comprise first and second zener diodes connected in anti-series with respective ones of at least two of the rectifying devices.

8. The converter circuit of claim 7 and including a bleeder resistor coupled in parallel circuit with the transformer primary winding.

9. The converter circuit of claim 8 wherein said voltage clamp comprises a zener diode.

10. The converter circuit of claim 9 wherein said output capacitor is connected in parallel circuit with one of said rectifying devices, said one of said rectifying devices being poled so as to preclude accumulation of a reverse voltage on said output capacitor.

11. The converter circuit of claim 8 wherein said voltage source comprises a voltage rectifier and doubler circuit connected to a source of low voltage ac.

* * * * *